July 5, 1927.
R. H. WAPPLER
BATTERY CASING
Filed May 10, 1923
1,634,475
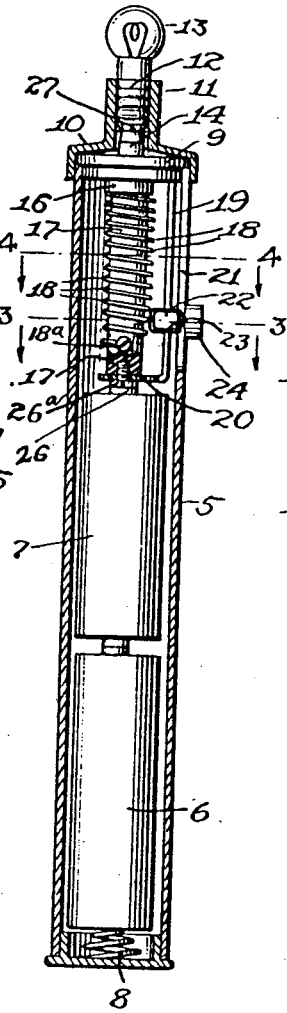
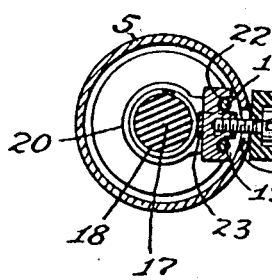
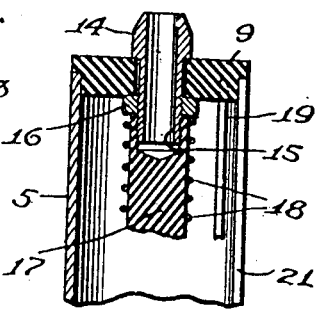
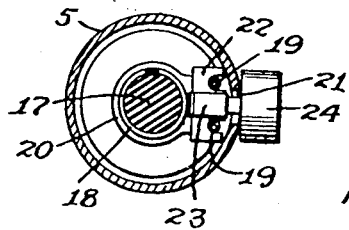
INVENTOR
Reinhold H. Wappler
BY Walton Harrison,
HIS ATTORNEY.
WITNESS
M. E. Lessin Patented July 5, 1927.

1,634,475

UNITED STATES PATENT OFFICE.

REINHOLD H. WAPPLER, OF YONKERS, NEW YORK, ASSIGNOR TO AMERICAN CYSTOSCOPE MAKERS, INC., A CORPORATION OF NEW YORK.

BATTERY CASING.

Application filed May 10, 1923. Serial No. 637,974.

My invention relates to battery casings for miniature incandescent lamps of the kind used in connection with illuminative diagnostic and surgical instruments, and for various kinds of flash lamps.

More particularly stated I seek to so arrange the battery, the incandescent lamp carried thereby and the rheostat for controlling the battery current, as to interpose the rheostat between the inner contact of the incandescent lamp, and the inner contact of the battery, thus leaving the battery casing as a whole, including the end caps, as a practical continuity of metal.

By this arrangement the rheostat is effectively housed in the part of the battery casing most convenient for the purpose and where it is not likely to get out of order; and yet the battery casing, though made altogether of metal, presents outwardly no surface such as, by coming into contact with extraneous objects, can cause a short circuit to take place.

I also seek to improve certain details in the construction of the various parts.

As is well known in this art, very often a battery casing of the general kind here contemplated is made of metal and has the form of a cylindrical casing. A dry battery of one or two cells is housed within the casing, and an incandescent lamp is supported by the casing, usually at one end thereof.

Reference is made to the accompanying drawing forming a part of the specification, and in which like reference characters indicate like parts throughout the several figures.

Figure 1 is a substantially longitudinal section through an improved battery casing made in accordance with my invention.

Figure 2 is a fragmentary central section through one end of the battery casing, and shows a portion of the rheostat.

Figure 3 is a section on the line 3—3 of Figure 1, looking in the direction indicated by the arrows.

Figure 4 is a section on the line 4—4 of Figure 1, looking in the direction indicated by the arrows.

The battery casing is shown at 5. It is made of sheet metal, and has the form of a cylinder. Two dry cells are shown at 6 and 7, and constitute the battery, which is housed within the casing. A spring 8 exerts pressure upon one end of the battery.

The casing 5 carries a disk 9 of insulating material, having the form shown more particularly in Figures 1 and 2, and held in position by an end cap 10. This end cap is provided with a socket 11, threaded internally, and fitting into this socket is the outer member contact 12, of a miniature incandescent lamp 13.

Extending through a hole in the end disk 9 is a sleeve 14, provided with a portion 15, threaded externally and having a diameter somewhat reduced. Fitted upon this sleeve is a nut 16. Mounted upon the reduced portion 15 of the sleeve 14 is a stem 17 of insulating material, carrying a resistance wire 18, the lower end of this wire being secured in position by screw 18ª.

The disk 9 carries a pair of small metallic rods 19, which at their bottom ends support a metallic disk 20. A screw 26ª extends through a hole in this disk, and engages the adjacent end of the stem 17. The battery casing 5 is provided with a slot 21.

Engaging the two rods 19 is a metallic slide 22, carrying a contact shoe 23, for making a sliding contact with the resistance wire 18. The slide 22 carries a thumb button 24, held in position upon it by a screw 25 or in any other appropriate manner.

The inner contact member of the battery cell 7 appears at 26, and is located a short distance from, but in axial alinement with, the inner contact member 27 of the lamp 13. A screw 26ª extends through a hole in the metallic disk 20, and into the stem 17.

The battery contact member 26 is lodged directly against the screw 26ª, which is a part of the rheostat; and the contact sleeve 14, which is also a part of the rheostat, is in engagement with the lamp contact 27. The net result is that the rheostat as a whole is interposed directly between the battery contact member 26 and the lamp contact member 27.

This particular arrangement of the rheostat has many advantages. It groups together most of the working parts which are apt to give trouble, and places them relatively near to the axial center of the casing, and thus where they are least likely to be disarranged by accident. By this arrangement the outer surface of the metallic casing now presents a continuous and uninterrupted extent of metal from one of its ends to the other, so that no short circuit can be formed by bringing any two exposed portions of the casing into contact with outside objects of conducting material.

The stem 17 of insulating material, and various other portions of the rheostat, are mounted quite firmly in position so as not to be easily disturbed or disarranged. The rod 17 is so firmly secured at both of its ends that it does not tend to become wabbly from use, and the various other parts are not likely to work loose.

The circuit may be traced as follows: Battery cells 6, 7, inner terminal 26, screw 26ª, disk 20, rods 19, slide 22, resistance wire 18, contact sleeve 14, inner contact member 27, lamp 13, outer contact member 12, socket 11, and cap 10, battery casing 5 and spring 8, back to battery cells.

The circuit is open when the slide 22 is in its lowermost position according to Figure 1. In other words there is no flow of current when the thumb button 24 is so near the adjacent end of the slot 21 as to disconnect the contact shoe 23 from the resistance wire 18.

The operation of my device may be readily understood from the foregoing description.

The parts being arranged and assembled as above described and as shown in the drawing, the device is in a general way handled as others of its kind. The operator by moving the button 24, so as to shift the slide 22 lengthwise of the slot 21, controls the battery current and thus regulates and controls the lamp.

Having thus described my invention what I claim as new and desire to secure by Letters Patent is as follows:

1. A device of the character described comprising a hollow casing of substantially cylindrical form and provided with a slot, a battery mounted within said casing and provided with a contact member, a disk of insulating material mounted within said casing, a rheostat mounted upon said disk of insulating material and provided with a contact member engaging said contact member of the battery, said rheostat being disposed adjacent said slot and provided with another contact member extending from said disk of insulating material, an incandescent lamp carried by said hollow casing and provided with a contact member extending from said disk of insulating material, said rheostat being provided with a slide extending through said slot and operable by hand for controlling said lamp by varying the resistance of said rheostat.

2. A device of the character described comprising a casing provided with a slot, an incandescent lamp and a battery carried by said casing, a rheostat carried by said casing and interposed bodily between said incandescent lamp and said battery, a disk of insulating material carried by said casing and connected with said rheostat for supporting the latter, a pair of rods mounted upon said disk and extending therefrom, another disk carried by said rods and connected with said rheostat, a slide mounted upon said rods and provided with a thumb piece extending through said slot for enabling the operator to control said rheostat.

3. In a device of the character described, the combination of a casing provided with a slot, an incandescent lamp carried by said casing, a battery mounted within said casing, a rheostat located within said casing and interposed bodily between said battery and said lamp, said rheostat being provided with a pair of guiding members independent of said casing and disposed adjacent said slot, and further provided with a slide engaging said guiding members, said slide carrying a thumb piece extending through said slot for enabling the slide to be actuated in order to control the resistance of said rheostat.

Signed at Long Island City, in the county of Queens and State of New York, this 5th day of May 1923.

REINHOLD H. WAPPLER.